Aug. 2, 1966     M. J. BUCKLEY     3,263,817

VIBRATING SIEVE

Filed May 6, 1963

INVENTOR.
MICHAEL J. BUCKLEY

BY

Oscar L. Spencer
ATTORNEY

3,263,817
VIBRATING SIEVE
Michael J. Buckley, Brackenridge, Pa., assignor to Pittsburgh Plate Glass Company, Pittsburgh, Pa., a corporation of Pennsylvania
Filed May 6, 1963, Ser. No. 278,110
8 Claims. (Cl. 210—388)

This invention is directed to an improved vibrating sieve having general utility for separating solid material from liquids having relatively high viscosity such as lacquers, paints and the like. This invention has specific utilities in separating comparatively large solid particles from inorganic enamels useful for and forming spandrel coatings on glass. These inorganic enamels are usually constituted of from 50 to 80 percent by weight of a finely divided glass frit (colored or clear) with the remainder being water or organic solvent.

In the preparation of enamels which are to be applied to glass surfaces in producing architectural glass spandrels it is deemed essential, as a final processing step prior to coating the enamels onto the glass, to remove comparatively large size solid particles, viz., larger than about 100 mesh as well as other foreign matter, e.g., scum, which has become introduced into the enamel during its process of manufacture as the presence of such materials in the final coated product causes blemishes and non-uniformity in the finished coated surface thereof.

Furthermore these foreign materials and large solid particles seriously hinder the efficiency of the coating procedure whereby the desired glass frit enamel coating is deposited onto the glass surfaces. One reason for this is the clogging of the spray gun apparatus especially the spray orifices from which the inorganic enamels are dispensed. Spray gun clogging requires time consuming dismantling and cleaning procedures to rectify these problems.

The blemished appearance and uneven coatings present special problems in controlling quality of the finished products when producing architectural glass spandrels and glass frit coated chalkboards since the frit enamel coating deposited on the glass surface is comparatively thin, viz., usually ranging from 0.010 to 0.040 inch in thickness. For these and other related reasons, it is necessary to strain the frit enamels before coating them onto the glass surfaces.

Prior to the present invention fine mesh, flat "pan sieve" type single-layer vibrated straining screens were employed in an attempt to accomplish satisfactory removal of the foreign matter and large solid particles present in these enamels. However, the use of these vibrated strainers presented serious problems because of the susceptibility of these strainers to clogging. Moreover, the clogging problem was compounded by punctures or holes in the fine mesh screening probably caused by a combination of a buildup of clog-trapped enamel with the fragile nature of the single-layered flat sieve construction.

Consequently the use of fine mesh flat, single-layered screens resulted in frequent and costly work stoppages to replace or repair the damaged sieves.

As a result and in order to avoid these frequent work stoppages, flat, single-layer straining sieves of coarser mesh were employed. However, the use of the coarser screens allows an unsatisfactory amount of foreign matter and large solid particles to gain access into the strained liquid, thus increasing clogging of the spraying apparatus and reducing the quality of the product.

Another possible alternative solution is to substantially curtail the speed of screening using fine mesh screens so as to avoid damage and breakage of the single layer, flat, fine mesh screens. This is highly objectionable since greatly increased time periods are required to effect the desired screening of these frit enamels.

Therefore, prior to this invention it was thought that in order to overcome the screening problems while using a fine mesh screen to produce a high grade product having little or no surface blemishes, it was necessary to endure a time penalty either due to increased work stoppages for repair or slower screening rates.

The present invention overcomes the screen breakage problem while allowing the production of high quality glass frit enamel coated glass articles and attains the above objectives while reducing the time period required for conducting the necessary pre-coating screening operation.

Therefore it is an objective of this invention to provide a vibrating screening device which when installed needs attention only at long intervals, and will steadily perform with a high degree of efficiency to attain faster, more efficient screening than can be secured using the above described flat, single-layer, fine mesh screens.

In describing the invention in detail reference will be had to the accompanying drawings wherein like reference characters denote the corresponding parts in several views, in which.

Figure 1:
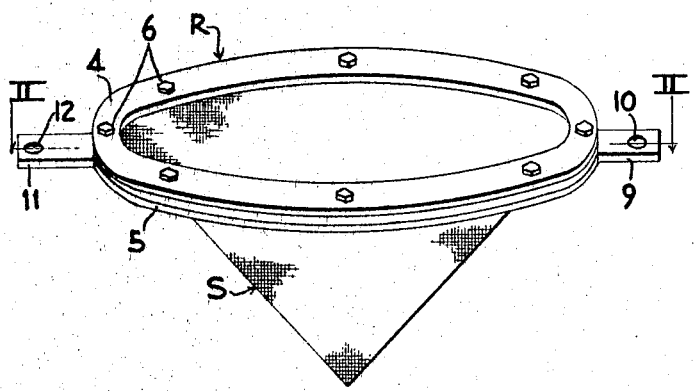
FIGURE 1 is a perspective view of the multi-layer, vibrating cone sieve screening apparatus of this invention.
Figure 2:
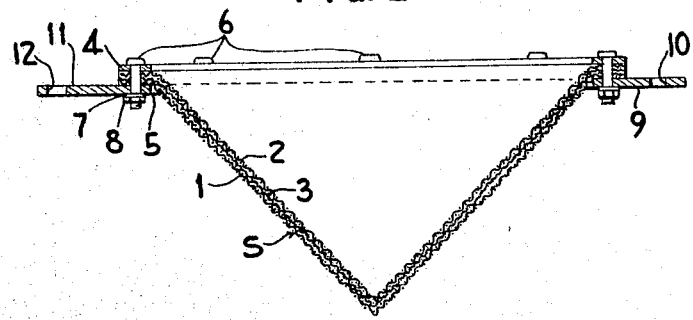
FIGURE 2 is a central longitudinal sectional view of the screening apparatus taken along the line II—II of FIGURE 1.

Referring to FIGURES 1 and 2 there is shown a filtering sieve S consisting of outer coarse mesh conical screens 1 and 2 having inner fine mesh conical screen 3 nested therebetween. Outer coarse mesh conical screen 1, intermediate fine mesh conical screen 3 and outer coarse mesh conical screen 2 have the same configuration and diameter and are positioned in nestling relationship. The term "outer" has been applied to coarse mesh screens 1 and 2 since they are located outwardly with respect to fine mesh conical screen 3. Outer screens 1 and 2 are substantially in contact with inner finer mesh conical screen 3 throughout the entire effective filtering area of the multi-layered screening structure.

The screens of the multi-layered sieve structure S are retained in place by upper and lower flat circular aluminum rings 4 and 5 respectively. The uppermost extremity of the multi-layered conical cone sieve extends between upper and lower rings 4 and 5 as shown in FIGURE 2. Upper ring 4 and lower ring 5 are fastened together by any suitable securing means such as threaded bolts 6 which pass through access openings in both the upper and lower rings and similar openings punched in screens 1, 2 and 3. Circular lock washers 7 and nuts 8 secure the rings and screens together. Lower ring 5 has an integral extension 9 with an orifice 10 therein to provide access for attaching the screen vibrator V to the lower ring. Lower ring 5 can also optionally have an integral extension 11 with an orifice 12 which allows the sieve to be hung on a suitable supporting hook during periods when the portable sieve is not in use.

It will be noted that the apices of outer conical screens 1 and 2 and inner fine mesh conical screen 3 are substantially in contact with one another and the apices of all the screens are located well below lower ring 5. The purpose for this is to insure adequate gravity flow of the comparatively viscous glass frit enamel to be filtered while at the same time insuring that the foreign matter and large size solid materials filtered by the multi-layered sieve will reside at the common vortex of the fluid in the sieve and eventually settle at the common apex of the cones thus not impairing the greater portion of the effective screening area of the conical sieve.

Lower coarse mesh conical screen 1 provides a support for fine mesh conical screen 3 and assists in carrying the load occasioned by the presence of not only the screened solid particles removed from the enamel but also the weight of the viscous enamel, itself. Upper coarse mesh conical screen 2 assists in like manner and preserves the fine mesh conical screen 3 from punctures by filtering any of the larger solid particles before they can accumulate on and/or cause puncture in the fine mesh conical screen 3 located therebeneath.

Figure 3:
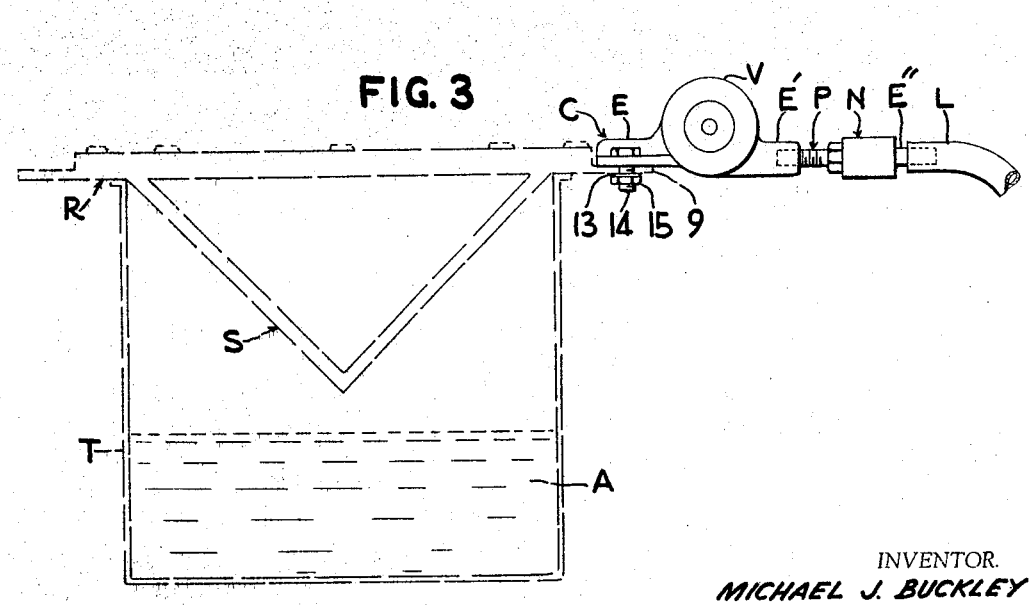
FIGURE 3 is a perspective view of the vibrating multi-layer cone screening apparatus deployed in place resting on the top of a tank containing screened liquid such as screened frit enamel and showing the vibrator.

FIGURE 3 shows the improved cone vibrating sieve screening apparatus as it is arranged during actual screening or viscous enamels or frit enamels or other liquids. There is shown multi-layered conical sieve S with rings 4 and 5 collectively designated at R resting on the top of enamel containing tank T which has screened enamel liquid A therein. Ring extension 9 of lower circular ring 5 is secured to vibrator V through connecting means C consisting of threaded bolt 14, lock washer 13 and nut 15. Threaded bolt 14 passes through orifice 10 of ring extension 9 and the mating orifice provided on extension E of vibrator V. The vibrator V is of the portable pneumatic actuated, multi-directional pulsating type.

An example of a suitable vibrator is the "BD 13 Vibrolator" available from Martin Engineering Company. This vibrator has essentially one moving part which is a steel ball pneumatically driven around a stationary hardened and finished ground interior race. Compressed air entering through the inlet port end of extension E' passes through a venturi nozzle which increases the velocity of the air. The accelerated air creates a turbine action within the hardened ball race to spin the ball at high speeds. The rapid circular action of the steel ball produces high frequency vibrations in all directions. The spent air then passes out at the center of the vibrator through exhaust ports. Such vibrators can produce vibrations ranging from about 5,000 to 21,000 multi-directional vibrations per minute. The interior structure of the vibrator V has not been shown as its mode of operation and structure are known in the vibrator art.

Pneumatic vibrator V has an integral extension E' communicating via its internal threaded port with threaded quick connecting air coupling N through threaded pipe fitting P. At the opposite end of the air coupling there is located a male extension E" which snap connects to a mating female extension (not shown) for connection of the air coupling N to an air line L (flexible hosing) which communicates directly with the output end of a conventional air compressor (not shown).

The multi-directional vibrations emanating from pneumatic actuated vibrator V are transmitted to lower ring 5 and in turn to multi-layered cone sieve S thereby assisting in accelerating the screening procedure.

It has been found from repeated testing that the employment of outer coarse conical screens 1 and 2 in close contact with interiorly located conical fine mesh screen 3 in the manner such as shown in FIGURE 2 causes the screens of the multi-layered sieve S to vibrate in unison. This factor plus the protection and substantial freedom from damage to inner fine mesh screen 3 results in the attainment of screening rates which are substantially greater than can be secured using the prior art employed single-layer, fine mesh, flat vibrated pan sieves.

Moreover, due to the employment of the subject multi-layered conical sieve, it is now possible to employ screens of finer mesh than could be used previously due to the protection and support afforded by outer coarse mesh conical screens 1 and 2. Also the use of conical screens in the vibrating sieve affords a greater straining efficiency since the conical shape provides for faster screening because of the larger surface area. Moreover the structure of the present invention allows the solid particles to collect in the vortex of the cone and eventually be deposited at the region of the common apex instead of clogging the effective screening area as was the case with conventional prior art "pan-type" flat single-layer vibrating sieves. Furthermore the ability to employ finer mesh screens to strain the enamels or other comparatively viscous liquids results in fewer solid particles passing into the enamel containing tank. In turn this results in higher quality enamel coated glass articles and substantially reduces clogging of the spraying apparatus.

In actual in-plant testing of the improved cone vibrating sieves of this invention, surprising improvements in straining speed and sieve durability were secured. Using a 200 mesh stainless steel screen as the fine mesh conical screen 3 and using 20 mesh stainless steel screening for the outer coarse mesh conical screens 1 and 2, the rate of screening was approximately doubled as compared to the use of a vibrated flat "pan" sieve (U.S. Standard type) having a single 100 mesh stainless steel flat screen. This increase in screening speed was accomplished despite the fact that a 200 mesh screen was used in the conical sieve.

Using the multi-layered conical type sieve described above and having a screen diameter of approximately 20 inches at the widest portion of the cone and being approximately from 9 to 10 inches deep, over 2300 hours of repair free glass frit enamel screening was attained. Essentially the same results in sieve durability were secured using a multi-layered conical cone vibrating sieve having a diameter of 15 inches and being from 8 to 9 inches deep.

Comparative testing (using conventional flat single-layer, 100 mesh stainless steel vibrating sieves having similar diameter and being approximately 2 inches deep) resulted in screen punctures and other damage requiring these flat "pan" sieves to be discarded after approximately an average of 210 hours of operation. Moreover, these flat "pan" sieves were repaired several times prior to discarding.

Hence it can be seen that the multi-layered, cone vibrating sieves of the present invention are much more durable and will provide a greater efficiency of operation over a longer period of time without necessity for repair.

While the foregoing description referred to the fine mesh cone screen 3 as being 200 mesh and the coarse screens 1 and 2 as being 20 mesh, it should be understood that the specific mesh of the fine and coarse cone screens can be varied depending upon several factors, including: the desired straining of the strained liquid, the viscosity of the liquid before straining etc.

Usually, however, mesh size of the coarse screens will range from about 5 to about 20 times coarser in mesh than that of the interior fine mesh screen in order to secure the desired support and protection. While coarse cone screens 1 and 2 can be of different mesh it is preferable to employ the same mesh for both coarse screens since this gives a more durable balanced construction when the multi-layered cone sieve is vibrated.

Also instead of pneumatic vibrators, other vibrating devices can be used, e.g., electro magnetic vibrators, mechanical vibrators, electrical vibrators, etc. all of which are conventional in the art of producing vibratory impulses.

While this invention has been illustrated in great detail in the foregoing description and drawings it should be realized that the invention in its broadest aspects is not necessarily limited to the specific structure as shown and described herein.

I claim:

1. A vibrating sieve screening apparatus comprising two outer coarse mesh conical screens and a fine mesh conical screen positioned in nested relationship therebetween, said fine mesh screen being substantially in contact with both said coarse mesh screens, upper and lower peripheral rings arranged exterior to said coarse mesh conical screens, fasteners to secure said rings and screens together, an access extension on one of said rings, a vibrator, and connecting means connecting said ring extension to said vibrator to transmit vibratory impulses from said vibrator to said ring to cause said screens to vibrate in unison.

2. A vibrating screening apparatus as in claim 1 wherein said vibrator is pneumatically actuated.

3. A vibrating screening apparatus as in claim 1 wherein said screens are metal screens.

4. A vibrating screening apparatus as in claim 1 wherein the mesh of said coarse mesh screens ranges from about 5 to 20 times coarser than said fine mesh screen.

5. A vibrating screening apparatus as in claim 1 wherein said vibrator is connected to said lower ring.

6. A vibrating screening apparatus as in claim 1 wherein said nested inner and outer conical screens are in contact over substantially all of their effective screening area.

7. A vibrating screening apparatus as in claim 1 wherein the apices of said nested inner and outer conical screens are in contact and located below said lower peripheral flange.

8. A vibrating screening apparatus as in claim 1 wherein said vibrator generates multi-directional vibratory impluses.

References Cited by the Examiner

UNITED STATES PATENTS 2,251,909  8/1941  Lindsay _____ 210—388

REUBEN FRIEDMAN, *Primary Examiner.*

S. ZAHARNA, *Assistant Examiner.*